May 15, 1973  D. D. LONG ETAL  3,733,238
APPARATUS FOR VIBRATION WELDING OF SHEET MATERIALS
Filed Dec. 13, 1971  2 Sheets-Sheet 1
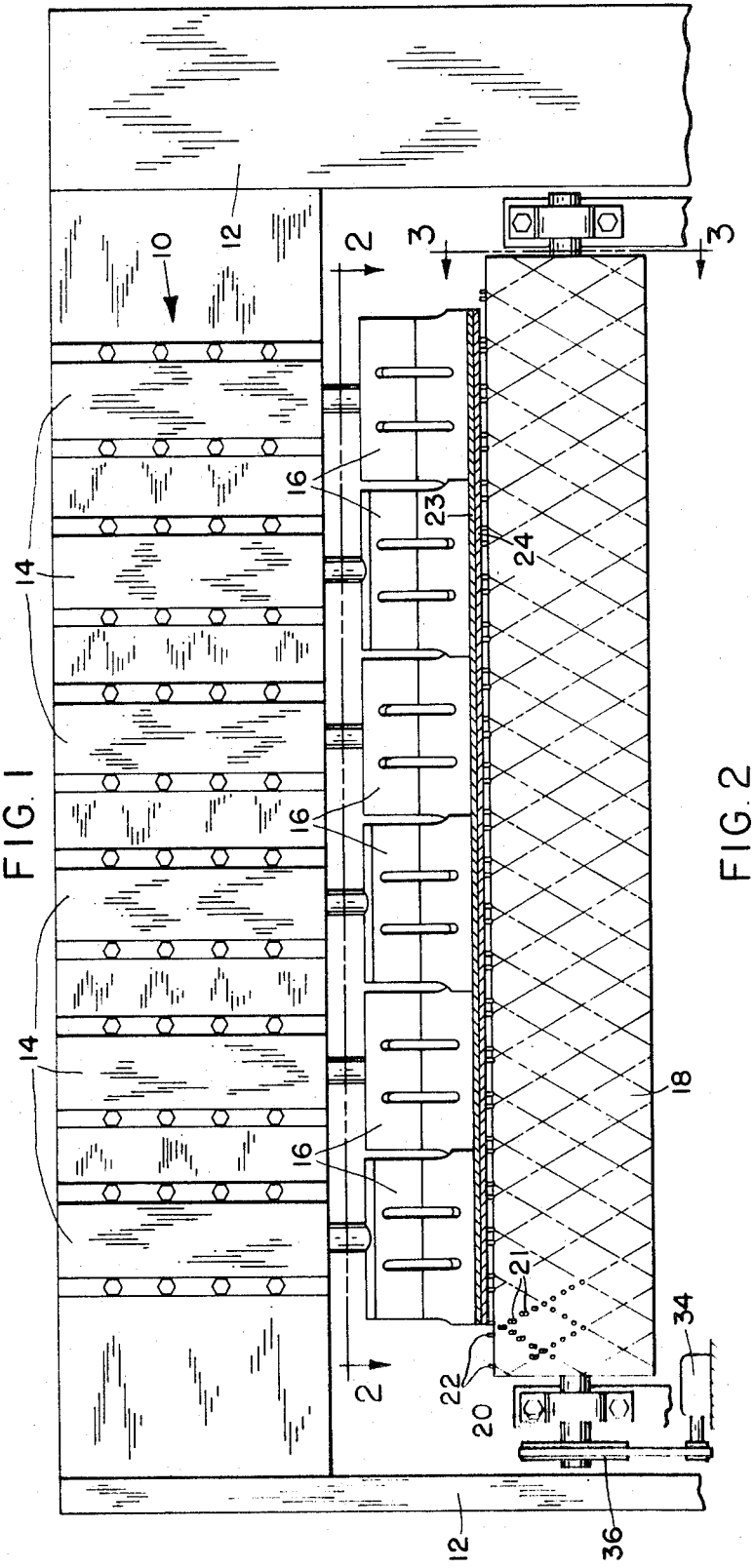
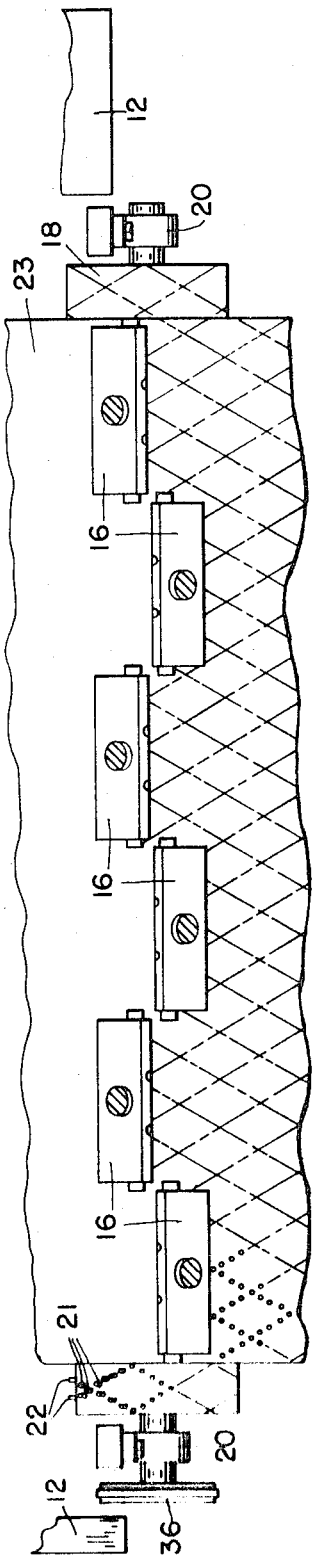

United States Patent Office 3,733,238
Patented May 15, 1973

3,733,238
APPARATUS FOR VIBRATION WELDING
OF SHEET MATERIALS
Delmar D. Long, Southbridge, and Edgar C. Rust, Jr., Williamstown, Mass., and Stanley L. Lawrence, Stamford, Vt., assignors to Crompton & Knowles Corporation, Worcester, Mass.
Filed Dec. 13, 1971, Ser. No. 207,322
Int. Cl. B06b *3/00;* B23k *1/06*
U.S. Cl. 156—580                                                7 Claims

ABSTRACT OF THE DISCLOSURE

Ultrasonic apparatus for welding thermoplastic sheet-like elements wherein a plurality of spaced ultrasonic vibration transmitting members having working surfaces in contact with one side of the sheet-like elements. The working surfaces cooperate with opposing spaced anvil surfaces located on the opposite side of the sheet-like elements for producing welds in the material therebetween. Means are provided to advance the sheet-like elements between the members and the anvil surfaces, said members being arranged so that every point across the width of one of the sheet-like elements comes into contact with at least one of said working surfaces.

BACKGROUND OF THE INVENTION

This invention relates to mechanism for producing laminated sheet materials and particularly for welding together of layers of thermoplastic materials by the use of ultrasonic vibration equipment. The products may be adapted for many uses, such as upholstery material, blankets, table covers, sleeping bags, and many other articles.

Apparatus for ultrasonically welding thermoplastic materials are well known in the art for producing seams and overlapping edges of one material to another. In pattern bonding, elements to be joined are engaged between an ultrasonically vibrating member having an elongated working surface and back-up anvil means having spaced raised surfaces corresponding to a desired pattern. Attempts to pattern bond superimposed "full width" or "open width" sheets of material have been handicapped by the practical limitations of existing vibration transmitting members. The limitations are in the planes perpendicular to the direction of the vibrations to be transmitted. The technical reasons for this are fully explained in U.S. Pat. 3,113,225 to Kleesattel et al. With increases in the effective or working dimension of the vibration transmitting member beyond a certain value, the costs of producing a transducer increase disproportionately to become prohibitive. Although the Kleesattel invention greatly increases the practical length of the vibration transmitting member from approximately three inches to ten inches, a much greater effective length is needed for producing "full width" fabrics of 36" or more. It is contemplated that several vibration transmitting members could be used to cover the entire width of the sheet-like elements to be bonded but these members cannot be in contact with each other, otherwise they would be ruined. If the members are sufficiently spaced from each other to avoid contact, patterning would be seriously limited. Since welds could not be produced in the area between members, unwelded "lines" would always appear in the finished product.

SUMMARY OF THE INVENTION

It is a general object of the invention to provide ultrasonic welding apparatus which utilizes a plurality of vibration transmitting members to produce "full width" thermoplastic laminated material without any patterning restrictions.

In accordance with the object of the invention, a plurality of vibration transmitting members are arranged across the width of the sheet-like elements to be joined but alternate ones of said members are offset in the lengthwise dimension of said sheet-like elements. The members are long enough to collectively cover every point between edges of the sheet-like elements as the elements are advanced through the welding area and offset enough to avoid contacting one another.

BRIEF DESCRIPTION OF THE DRAWINGS

FIG. 1 is a front elevation of a machine embodying the invention, portions being broken away;
FIG. 2 is a longitudinal section on line 2—2 of FIG. 1, looking down on the machine.

DETAILED DESCRIPTION OF THE INVENTION

Figure 3:
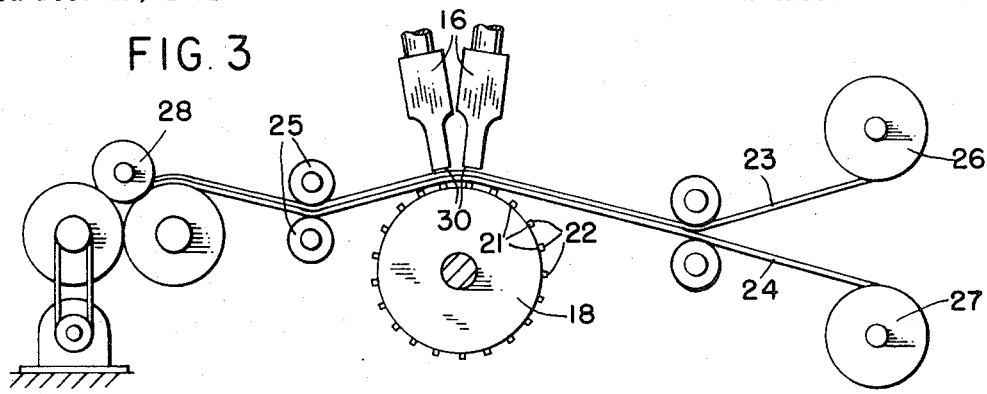
FIG. 3 is section on line 3—3 of FIG. 1, looking in the direction of the arrows.

Referring to FIGS. 1 and 2, a machine embodying the ultrasonic welding apparatus of the invention is indicated generally at 10 and includes supporting framework 12.

Mounted within the framework 12 are electrical transducer units 14 for imparting ultrasonic vibrations to vibration transmitting members 16 in a manner well-known in the art.

A pattern roll 18 is rotatably mounted between supporting brackets 20 on the frame 12. Roll 18 has a series of projections 21 arranged in a pattern and having outer surfaces 22 which function as anvils for vibration transmitting members 16.

As shown in FIG. 3, the sheet-like elements to be joined are indicated at 23 and 24 and are drawn by a pair of takeup rolls 25 from separate supply rolls 26 and 27, respectively to pass between vibration transmitting members 16 and pattern roll 18 as superimposed sheets where they are joined in a manner to be described. The joined elements 23 and 24 are then collected as a laminated product on a roll 28. Rolls 25 and 28 are driven by conventional drive means.

At least one of the elements 23 and 24 must contain thermoplastic material although the entire sheet need not be 100% thermoplastic. It has been found, in fact, that blends of thermoplastic and non-thermoplastic materials produce a superior bond to that of a 100% thermoplastic material. The term "thermoplastic material" as used throughout this application, therefore includes materials which are blends of thermoplastic and non-thermoplastic materials.

Vibration transmitting members 16 are arranged in two rows extending across the width of elements 23 and 24, with alternate members being offset in the direction of travel of the elements as shown in FIGS. 2 and 3. Lower working surfaces 30 of members 16 cooperate with outer surfaces 22 of projections 21 to form welds in the elements therebetween. The longitudinal axes of adjacent members 16 are arranged in different planes which converage toward the roll 18 so that surfaces 30 are substantially parallel to surfaces 22 when they are in the position of full alignment to make a more uniform weld between elements 23 and 24. Members 16 are long enough so that, collectively, they cover the entire width of the elements 23 and 24 and are offset enough in the lengthwise direction of the elements so that there is no chance of contact between members. To insure that each point across the width of the sheet-like elements comes into contact with at least one of the working surfaces, members 16 overlap slightly in the lengthwise direction of elements 23 and 24. Roll 18 is rotatably driven from a motor 34 through conventional driving elements 36 so that new projections 21 are continually brought into cooperating position with surfaces 30. The projections 21 can be arranged in any desired pattern as shown for example in FIG. 2 and this pattern will be reproduced in the form of welds in joining the elements 23 and 24 as they pass between members 16 and roll 18. If desired, additional sheet-like elements may be introduced together with elements 23 and 24 to form a wide variety of com-composite products. As an example, a fluffy non-woven batt could be introduced between elements 23 and 24 to form a quilted product.

Figure 4:
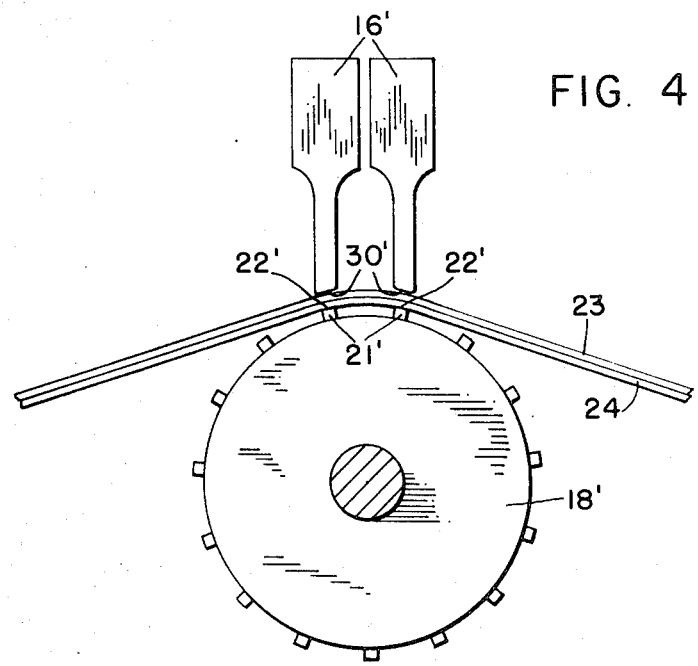
FIG. 4 is a view similar to FIG. 3, showing a modification.

Referring to FIG. 4, there is shown a modification comprising a pattern roll 18' and vibration transmitting members 16', arranged in the same offset relationship as members 16 except that they are disposed parallel to each other. Members 16' are identical to members 16 except that the lower working surfaces, indicated at 30', are disposed on a slight angle so as to be substantially parallel to the outer surfaces 22' of the pins 21' with which they cooperate.

Figure 5:
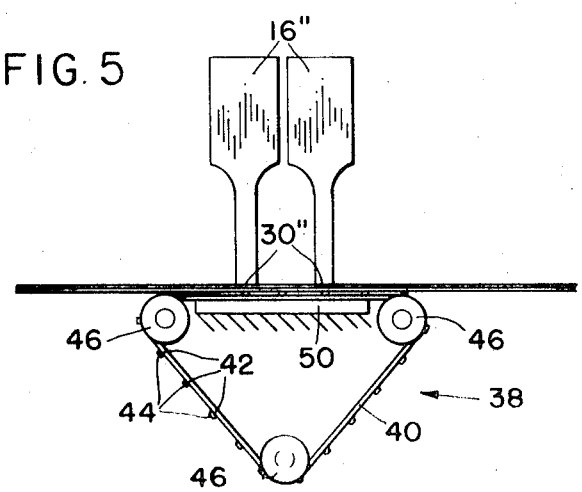
FIG. 5 is a view similar to FIG. 3, showing a second modification.

Referring to FIG. 5, a second modification is shown wherein the anvil means, indicated generally at 38, comprises a conveyor 40 having projections 42 with opposing surfaces 44 for cooperating with working surfaces 30" of vibration transmitting members 16". Conveyor 40 is trained around driven pulleys or the like 46 so that projections 42 are sequentially positioned into cooperating relationship with members 16". A supporting platform 50 is positioned beneath the upper run of the conveyor 40 to prevent deflection of the conveyor by the members 16" which are disposed in two offset rows in a manner similar to members 16 as shown in FIG. 2. Since the upper run of the conveyor 40 passes horizontally through the welding zone, members 16" are disposed vertically in parallel planes with their working surfaces lying in a common horizontal plane.

Having particularly described the invention, what is now claimed is:

1. Apparatus for joining two or more sheet-like elements, at least one of which contains a thermoplastic material, comprising:
   (a) means to advance the sheet-like elements to be joined from a source of supply;
   (b) a plurality of spaced ultransonic vibration transmitting members, each having a working surface in contact with one side of said sheet-like elements, each member being offset from adjacent members in the longitudinal direction of the elements and said members being arranged so that every point across the width of one of said sheet-like elements comes into contact with at least one of said working surfaces;
   (c) anvil means located on the other side of said sheet-like elements, comprising spaced projections having opposing surfaces for cooperating with the said working surfaces to produce welds in the portions of said sheet-like elements located between said working surfaces and said opposing surfaces.

2. The apparatus as described in claim 1 wherein said projections are arranged in a pattern and are movable relative to the working surfaces of said vibration transmitting members to create a decorative welding pattern in said sheet-like elements.

3. The apparatus as described in claim 2 wherein said projection are mounted on a rotatably mounted roll, said opposing surfaces being parallel with said corresponding working surfaces when in cooperating alignment therewith.

4. The apparatus as described in claim 3 wherein each of said opposing surfaces is perpendicular to a line running through said surface and the center of said roll, the working surfaces of said vibration transmitting members also being perpendicular to a line running through said working surface and the center of said roll.

5. The apparatus as described in claim 4 wherein the longitudinal axes of adjacent vibration transmitting members lie in separate planes which converge toward said roll.

6. The apparatus as described in claim 2 wherein said projections are mounted on a conveyor.

7. The apparatus as described in claim 1 wherein the outer longitudinal ends of said vibration transmitting members overlap in the direction of travel of said sheet-like elements.

References Cited

UNITED STATES PATENTS

| | | | |
|---|---|---|---|
| 3,562,041 | 2/1971 | Robertson | 156—73 |
| 3,113,225 | 12/1963 | Kleesattel et al. | 226—196 X |
| 3,088,343 | 5/1963 | Balamuth et al. | 228—44 X |
| 3,272,682 | 9/1966 | Balamuth et al. | 156—580 |

DOUGLAS J. DRUMMOND, Primary Examiner

M. G. WITYSHYN, Assistant Examiner

U.S. Cl. X.R.

156—73; 228—1